United States Patent Office 3,497,314
Patented Feb. 24, 1970

3,497,314
RECOVERY OF POTASSIUM FROM SEA WATER
Charles L. Thomas, Swarthmore, Pa., assignor to Sun Oil Company, Philadelphia, Pa., a corporation of New Jersey
No Drawing. Filed Apr. 24, 1967, Ser. No. 632,918
Int. Cl. C01d 3/06
U.S. Cl. 23—50     7 Claims

ABSTRACT OF THE DISCLOSURE

Potassium can be recovered from sea water by contacting sea water with the natural zeolite, glauconite which has had part of its potassium removed by treatment with an ammonium salt solution (6 N $NH_4Cl$) whereby a portion of the K in the glauconite is recovered. Then after contacting with sea water the glauconite is again treated with the ammonium salt solution to recover K which the glauconite preferentially removed from the sea water to replace that which was initially removed. The alternate treatment with ammonium salt and contact with sea water can be repeated indefinitely with the same glauconite.

BACKGROUND OF THE INVENTION

The sea offers a vast storehouse of alkali metals. The amounts of alkali metals (as combined salts) contained in the oceans of the world are greater than all of the known recoverable deposits on the land areas. The principal problem with recovering any of these materials from sea water has been the very low concentrations of the alkali metal salts. All of the recovery techniques applied to alkali metal salts in sea water have been, necessarily, concentrations.

Potassium is contained in salt water brines in modest but substantial amounts. As the available supplies of potassium dwindle or become more clostly to mine, interest in its recovery from sea water has increased. No discussion on the value of potassium compounds such as potash ($K_2CO_3$) to industry and agriculture is necessary. Needless to say, it would be desirable to have alternative sources of potassium available to the known mineral deposits.

Several methods have been applied to recovering potassium from sea water. Some of the prior methods include (1) precipitation of potassium from sea water with highly nitrated secondary amines, (2) the use of ion exchange resins containing the metal compounds of polyvinyl-pentanitro-diphenyl amine, and (3) precipitation of potassium compounds by adding phosphate ions to brine and adjusting the pH to between 7.5 to 9.5.

SUMMARY OF THE INVENTION

Briefly stated, the present invention involves a process of recovering potassium compounds from a brine solution comprising contacting partially depotassiumated glauconite with seat water, treating the glauconite with an ammonium salt solution and recovering potassium compounds.

Prior ot its first contact with sea water the glauconite is treated with an ammonium salt solution to partially remove the potassium therein. This treatment can be essentially the same as the treatment applied to the glauconite after contact with sea water.

After each treatment of the glauconite with ammonium salts the glauconite can be contacted with sea water again and the process repeated. This alternate ammonium salt treatment and sea water contact can be repeated indefinitely.

In a further refinement of the process the glauconite salt and their treatment of glauconite with sea water is heated after the ammonium salt treatment and prior to contact with sea water to recover ammonia.

DESCRIPTION OF THE INVENTION

The present invention relies on the ability of glauconite preferentially to entrap potassium ions and the ability of ammonium ions to displace the potassium ions.

Glauconite is a naturally occurring zeolite mineral often called "green sand." It is crystalline probably having a mica-like structure and has been represented by

[K(Mg,Fe)(Al,Fe)(OH)$_2$Si$_4$O$_{10}$+
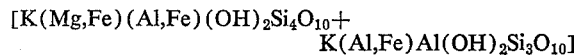
K(Al,Fe)Al(OH)$_2$Si$_3$O$_{10}$]

but, in fact, is more complex.

Glauconite contains 5–10 wt. percent of potassium. Representative sea water contains, for example, 10,768 p.p.m. of sodium ion, 1298 p.p.m. of magnesium ions, 408 p.p.m. of calcium ions, and 388 p.p.m of potassium ions. Under such concentration conditions as exist in sea water the potassium should be essentially displaced by the alkali metal and alkali earth metal ions but it is not. Regardless of the duration of the treatment, sea water will not cause a displacement of any of the potassium in glauconite.

Without attempting to limit the scope of the present invention, the following mechanism is proposed. Of the four rather highly concentrated alkali metal and alkali earth metal ions found in sea water, potassium has the largest ionic radius (A.) as can be seen from Table I.

TABLE I

| Element: | Ionic radii (A.) |
|---|---|
| K | 1.33 |
| Ca | 0.99 |
| Na | 0.95 |
| Mg | 0.65 |

It is proposed that the crystal lattice of glauconite is such that it acts as an "ion sieve" through which the smaller ions can pass but which ensnares and holds the larger potassium ions.

It has been found that 10–20 wt. percent of the potassium contained in glauconite can be recovered therefrom by treating the glauconite with a solution of an ammonium salt. Any ammonium salt having the formula $NH_4A$ where A is any anion which will combine with ammonia to form a water-soluble salt can be used. These include ammonium chloride, ammonium bromide, ammonium iodide, ammonium fluoride, ammonium cyanide, ammonium ferrocyanide, ammonium ferricyanide, ammonium bifluoride, ammonium nitrate, ammonium nitrite, ammonium phosphate, ammonium sulfate, ammonium sulfite, ammonium sulfide, ammonium acetate, ammonium formate, ammonium propionate, ammonium butyrate, ammonium benzoate, ammonium citrate, ammonium malate, ammonium laurate, ammonium stearate, ammonium oleate, ammonium salicylate, ammonium succinate, ammonium tartrate and the like.

In further postulation of the non-limiting mechanism proposed, it is believed that the large entrapped potassium ion can be displaced by the large ammonium ion (ionic radius = 1.48 A.).

Regardless of the mechanism involved, the elution of glauconite with an ammonium salt solution of 1 N to 10 N concentration is effective to remove a portion of the potassium. The elution is carried out usually by contacting the ammonium salt with the glauconite for a period of 30 minutes to six hours. Temperatures are in the range of 50° to 300° F.; pressure is usually atmospheric but can be 15 to 500 p.s.i.g.

The process involves, in its simplest form, the alternate treatment of glauconite with a solution of an ammonium salt with recovery of the potassium as the corresponding to replace the potassium ions removed therefrom. Alternatively, after the elution with the ammonium salt the glauconite can be heated to recover ammonia.

The following example is presented to aid in the understanding of the invention.

EXAMPLE

Finely powdered glauconite containing 8 wt. percent of potassium is stirred for two hours at 195° F. in a 6 normal aqueous $NH_4Cl$ solution. The recovered eluant is found to contain 1.1 wt. percent of potassium or about 13.7% of the potassium contained in the glauconite.

The treated glauconite is then treated with 10 volumes of sea water containing at least the following ions:

| Ion: | P.p.m. |
|---|---|
| Na | 10,768 |
| Mg | 1,298 |
| Ca | 408 |
| K | 338 |

The contacting was at about 70° F.

The glauconite is again treated as above with 6 N $NH_4Cl$. The eluant is found to contain 1.3 wt. percent of potassium or about 16.3% of the potassium originally present in the glauconite.

The alternate $NH_4Cl$-sea water treatment is repeated a total of 10 times. The results are set out in Table II.

No substantial amount of any other alkali metal or alkaline earth metal was detected in the effluent recovered from treated glauconite. The potassium ammoniacal

TABLE II

| Treatment with 6 N $NH_4Cl$ Number: | Wt. percent potassium | Percent potassium recovered/ based on K originally present in glauconite |
|---|---|---|
| 1 | 1.1 | 13.7 |
| 2 | 1.3 | 16.3 |
| 3 | 1.1 | 13.7 |
| 4 | 0.8 | 10.0 |
| 5 | 0.8 | 10.0 |
| 6 | 1.5 | 18.8 |
| 7 | 1.1 | 13.7 |
| 8 | 0.7 | 8.8 |
| 9 | 1.2 | 15.0 |
| 10 | 1.1 | 13.7 |
| Total | | 133.7 | salt can be recovered and converted to other salts or can be evaporated to dryness and heated to sublime the ammonium salt and recover the potassium salt as a residue. These recovery procedures are known in the art.

The glauconite can be disposed in beds or columns through which the ammonium salt solution and sea water are alternately passed.

The invention claimed is:

1. A process for recovering potassium from sea water comprising treating a glauconite with an ammonium salt solution, contacting the treated glauconite with sea water, treating the glauconite with an ammonium salt solution and recovering potassium compounds.

2. A process according to claim 1 wherein the ammonium salt has the formula $NH_4A$ where A is any anion which will combine with ammonia to form a water soluble salt.

3. A process according to claim 1 wherein the ammonium salt is present in a concentration of 1 N to 10 N.

4. A process according to claim 3 wherein the treatment with ammonium salt is for a period of 30 minutes to six hours.

5. A process according to claim 4 wherein the treatment with ammonium salt is conducted at a temperature in the range of 50 to 300° F.

6. A process according to claim 5 wherein the glauconite is treated alternately with sea water and ammonium salt.

7. A process according to claim 6 wherein subsequent to treatment with ammonium salt and prior to contacting with sea water, the glauconite is heated and ammonia is recovered.

References Cited

UNITED STATES PATENTS

| 1,978,447 | 10/1934 | Austerweil et al. | 23—38 |
| 2,004,257 | 6/1935 | Tschirner. | |
| 2,258,381 | 10/1941 | Fleischer et al. | 23—38 |
| 2,617,712 | 11/1952 | Bond | 210—38 X |
| 2,619,404 | 11/1952 | Skogseid | 23—50 |
| 2,659,656 | 11/1953 | Berner et al. | 23—38 |

HERBERT T. CARTER, Primary Examiner

U.S. Cl. X.R.

23—38